May 13, 1941. A. A. TAYLOR 2,241,529
ANIMAL TRAP
Filed Jan. 22, 1941 2 Sheets-Sheet 1
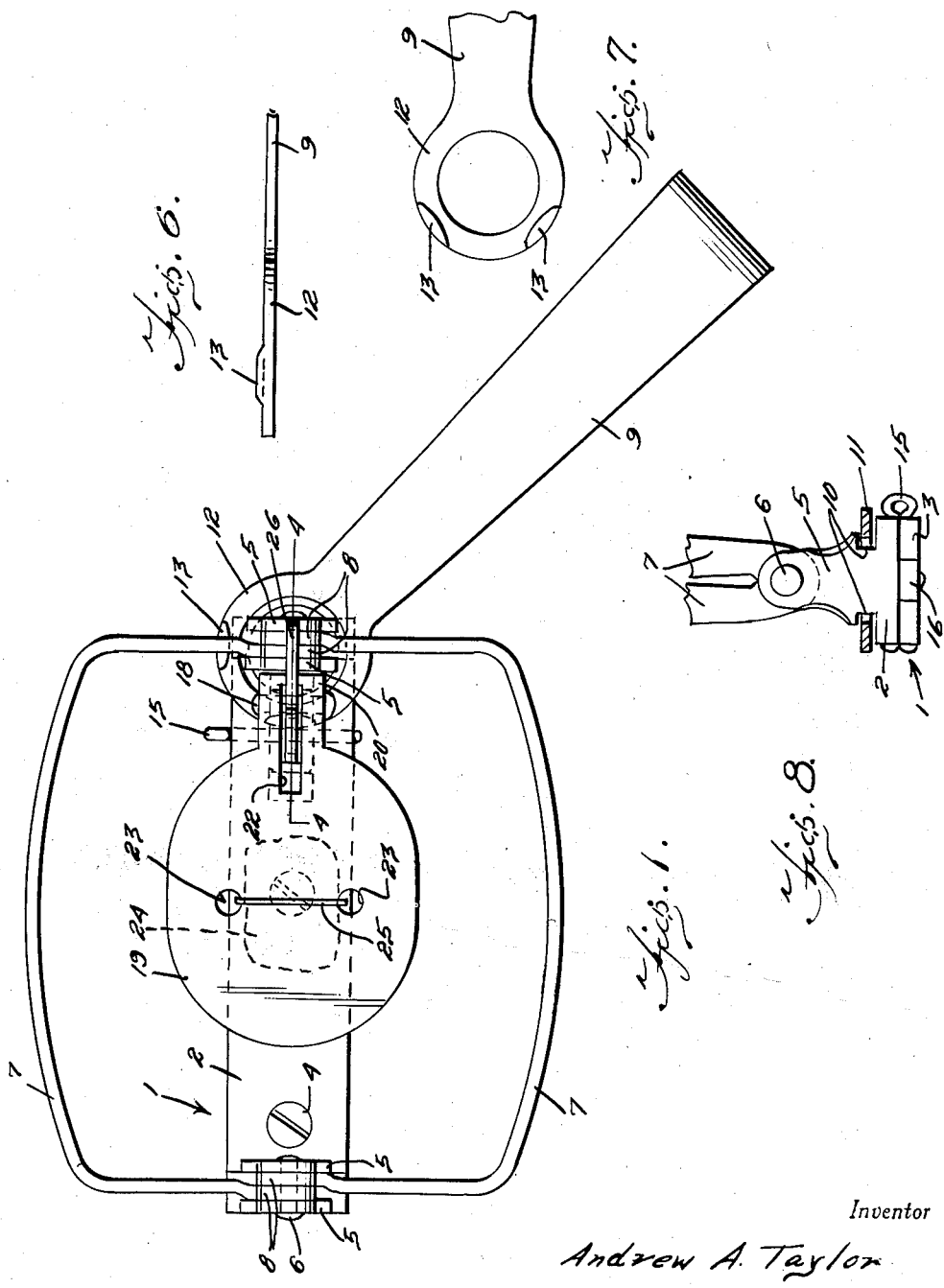
Inventor
Andrew A. Taylor
By Clarence A. O'Brien
Attorney May 13, 1941.  A. A. TAYLOR  2,241,529
ANIMAL TRAP
Filed Jan. 22, 1941  2 Sheets-Sheet 2
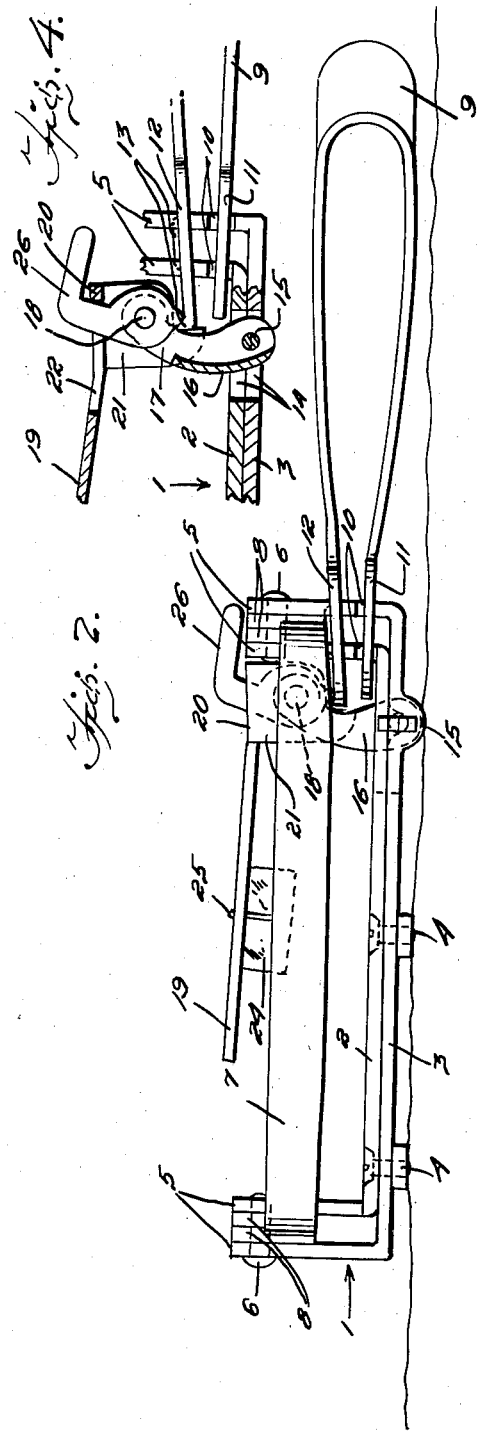
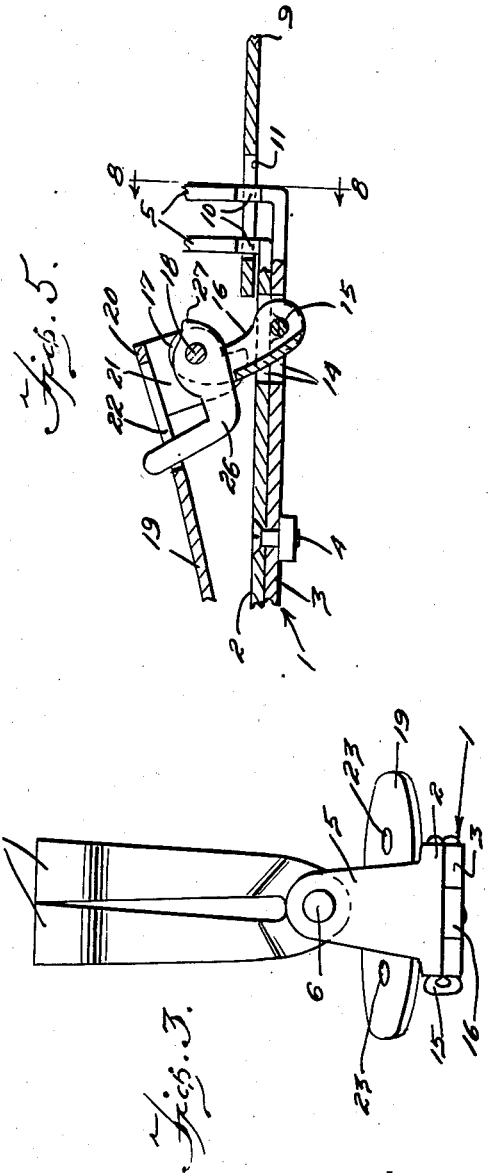
Inventor
Andrew A. Taylor
By Clarence A. O'Brien
Attorney Patented May 13, 1941

2,241,529

UNITED STATES PATENT OFFICE 2,241,529

ANIMAL TRAP

Andrew A. Taylor, Petersburg, Territory of Alaska, assignor of one-half to Charles A. J. Lindstrom, La Conner, Wash.

Application January 22, 1941, Serial No. 375,495

4 Claims. (Cl. 43—88)

The present invention relates to new and useful improvements in animal traps and has for its primary object to provide, in a manner as hereinafter set forth, a device of this character comprising a unique trigger mechanism whereby the trap will be sprung when the pan is swung either upwardly or downwardly from its normal set position.

Another very important object of the invention is to provide a trap of the aforementioned character wherein the spring, when the trap is set, is swung laterally to an angular position out of longitudinal alignment thereby facilitating the approach of the animal from either end of the trap.

Still another very important object of the invention is to provide an animal trap of the character described wherein the pivoted jaws, when the trap has been set, are free and independent of the spring whereby said jaws may be swung upwardly to any desired position.

A still further important object of the invention is to provide a trap of the character set forth embodying a novel frame structure for pivotally supporting the jaws and for retaining said jaws in alignment.

Another important object of the invention is to provide an animal trap of a construction and arrangement whereby the pan will be in a level plane at all times when the trap is set.

Other objects of the invention are to provide an animal trap of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of an animal trap constructed in accordance with the present invention, showing said trap set.

Figure 2 is a view in side elevation thereof.

Figure 3 is a view in front elevation, showing the trap in unset position.

Figure 4 is a view in vertical longitudinal section through the trigger mechanism and adjacent parts, taken substantially on the line 4—4 of Figure 1, the end portions of the spring being shown in side elevation.

Figure 5 is a view substantially similar to Figure 4 but showing the trigger mechanism in released position.

Figure 6 is a view in side elevation of the upper end portion of the spring.

Figure 7 is a top plan view of the upper end portion of the spring.

Figure 8 is a cross sectional view, taken substantially on the line 8—8 of Figure 5.

Referring now to the drawings, in detail, it will be seen that the embodiment of the invention which has been illustrated comprises a base or frame which is designated generally by the reference numeral 1. The frame 1 includes comparatively short and long upper and lower metallic bars 2 and 3, respectively, which are firmly secured together in any suitable manner, as at 4. The bars 2 and 3 terminate in upturned end portions providing spaced ears 5. Extending between the spaced pairs of ears 5 are longitudinal pins 6. Mounted on the pins 6 for swinging movement in a vertical plane is a pair of substantially U-shaped coacting jaws 7. The jaws 7 are provided, on their ends, with longitudinally aligned eyes 8 which are journaled on the pins 6 between the pairs of ears 5.

The jaws 7 are swung to closed position when the trap is sprung through the medium of a spring 9 which normally is substantially V-shaped. The ears 5 on one end of the frame 1 have formed in their lower portions notches or recesses 10. At one end, the spring 9 terminates in an eye 11 which is journaled on these ears 5 in the notches 10. At its other end, the spring 9 terminates in an eye 12 which is operatively engageable with the adjacent end portions of the jaws 7 for closing said jaws. When the trap is in set position the upper eye 12 encircles the adjacent ears 5 and is located beneath the spread, substantially horizontal jaws 7. Rising from the upper eye 12, on opposite sides of the front portion thereof, are spaced lips or ribs 13 the purpose of which will be presently set forth.

The inner or rear end portions of the bars 2 and 3 have formed longitudinally therein communicating slots 14. The slots 14 expose a pin 15 which is clamped between the bars 2 and 3 of the frame 1. Journaled for swinging movement in a vertical plane on the pin 15 and operable in the slots 14 is an upstanding link 16 of substantially U-shaped cross section. The upper portion of the link 16 is slotted in a manner to provide bifurcations 17. Mounted transversely on the bifurcations 17 is a pin 18.

Pivotally mounted on the upper end portion of the link 16 is a pan 19. The pan 19 includes a rear tongue portion 20 from the longitudinal sides of which ears 21 depend. The ears 21 are journaled on the end portions of the pin 18 on the outer sides of the link 16. It will thus be seen that the pan 19 is mounted for compound swinging movement on the frame 1. The rear portion of the pan 19 has formed therein a longitudinal slot 22 the purpose of which will also be presently set forth. The pan 19 has formed therein transversely spaced apertures 23 for tying bait 24 to said pan, as at 25. Thus, the bait may be mounted either above or below the pan 19.

Journaled on the pin 18 between the bifurcations 17 of the link 16 is a trigger 26 in the form of an angular cam lever which is operable in the slot 22 in the pan 19. The pivoted end portion of the trigger 26 is engageable on the eye 12 and comprises a lug or the like 27 which is engageable selectively with the ribs 13 for securing the trap in set position when said trigger is swung past dead center.

It is thought that the operation of the trap will be readily apparent from a consideration of the foregoing. Briefly, the trap is set by swinging the spring 9 laterally in either direction and compressing or tensioning said spring thereby permitting the jaws 7 to be opened. The pan 19 and the link 16 are then swung upwardly and rearwardly for bringing the pivoted end portion of the trigger 26 over the forward portion of the eye 12. With the spring 9 extending angularly from the frame 1, as seen in Figure 1 of the drawings, one of the ribs 13 is located beneath the trigger 26. The trigger 26 is now swung upwardly and rearwardly in the guide slot 22 in the pivoted end portion of the pan 19 thereby engaging the cam on the pivoted end of said trigger with the eye 12. This movement of the trigger 26 is continued until said trigger is swung past dead center, at which time the lug 27 engages the adjacent rib 13. In this manner the trigger mechanism is utilized to hold the spring 9 under tension thereby keeping the jaws 7 free to be swung upwardly to any desired position. When the jaws 7 are swung upwardly with the trap in set position said jaws will be spaced from the spring 9. This permits the jaws to be struck with considerable force when the trap is sprung. This also permits the trap to be successfully used in comparatively narrow or restricted places. If the pan 19 is swung downwardly by the animal, the rear end wall of the slot 22 swings the trigger 26 forwardly and disengages said trigger from the eye 12 thereby springing the trap. Should the pan 19 be swung upwardly the rear end thereof engages the adjacent ear 5 on the rear end of the frame 1 and causes the link 16 to swing forwardly in a manner to disengage the trigger 26 from the eye 12.

It is believed that the many advantages of an animal trap constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A trap comprising a frame including superposed, comparatively short and long upper and lower bars secured together, said bars terminating in upturned end portions constituting pairs of spaced, aligned ears, a pair of coacting jaws pivotally mounted between the pairs of ears, resilient means for closing said jaws, and trigger means operable by an animal for releasably securing the jaws in open position.

2. An animal trap comprising a frame, a pair of coacting jaws pivotally mounted on said frame, a spring mounted on the frame for closing the jaws, a link pivotally mounted on the frame, a trigger pivotally mounted on said link and including a cam on its pivoted end engageable with the spring for securing said spring under tension, and an animal operated pan pivotally mounted on the link and operatively connected to the trigger for disengaging said trigger from the spring for releasing said spring.

3. An animal trap comprising a frame including upturned ears on its ends, a pair of coacting jaws pivotally mounted on said ears, a spring including an eye on one end journaled on certain of the ears, an eye on the other end of the spring engageable with the jaws for closing said jaws, ribs on the second named eye, a link pivotally mounted on the frame, a trigger pivotally mounted on said link and including a cam on its pivoted end operatively engageable with the second named eye and the ribs thereon for releasably securing the spring under tension, and a pan, operable by an animal, pivotally mounted on the link and operatively engaged with the trigger for actuating said trigger for releasing the spring.

4. An animal trap comprising a frame including upturned ears on its ends, a pair of coacting jaws pivotally mounted on said ears, a spring including an eye on one end journaled on certain of the ears, an eye on the other end of the spring engageable with the jaws for closing said jaws, ribs on the second named eye, a link pivotally mounted on the frame, a trigger pivotally mounted on said link and including a cam on its pivoted end operatively engageable with the second named eye and the ribs thereon for releasably securing the spring under tension, and a pan, operable by an animal, pivotally mounted on the link and operatively engaged with the trigger for actuating said trigger for releasing the spring, the pivoted end portion of said pan having a slot therein, said trigger being operable in the slot.

ANDREW A. TAYLOR.